Dec. 10, 1940.   P. SACKS ET AL   2,224,747
BRAKE LOCKING MECHANISM FOR AUTOMOBILES
Filed Sept. 2, 1938   2 Sheets-Sheet 1

Inventors
Philip Sacks
and Marion M. McCoy
By Leonard E. Fischer
Attorney

Dec. 10, 1940.　　P. SACKS ET AL　　2,224,747
BRAKE LOCKING MECHANISM FOR AUTOMOBILES
Filed Sept. 2, 1938　　2 Sheets-Sheet 2
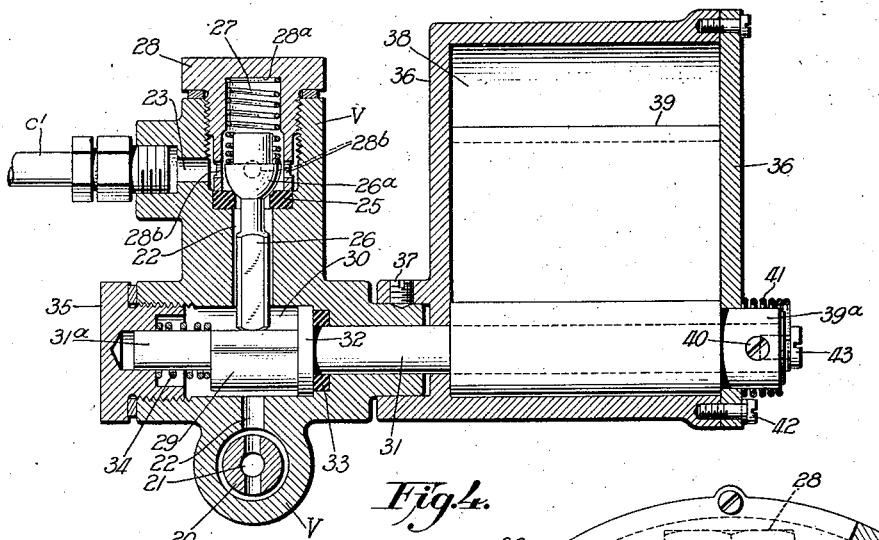
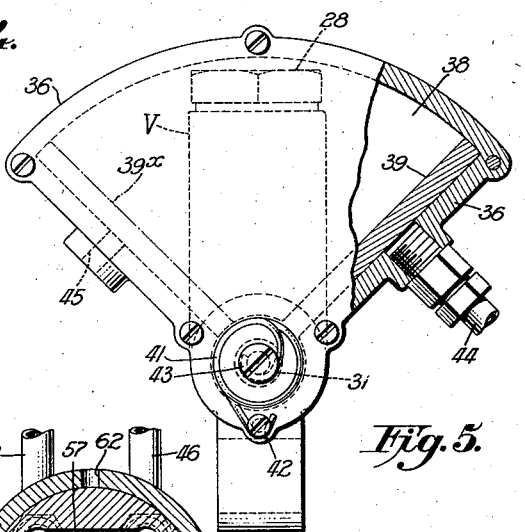
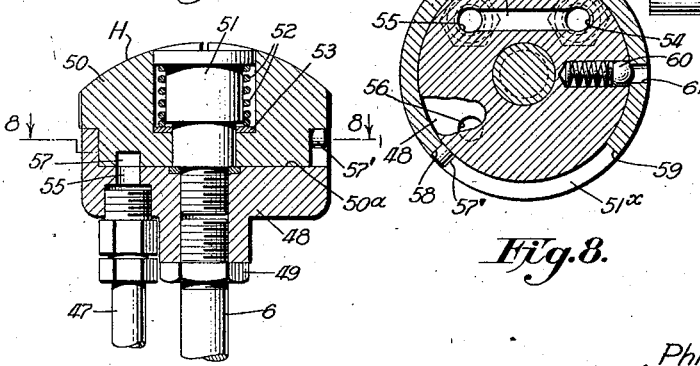
Inventors
Philip Sacks
and Marion M. McCoy
By Leonard E. Fischer
Attorney Patented Dec. 10, 1940

2,224,747

UNITED STATES PATENT OFFICE 2,224,747

BRAKE LOCKING MECHANISM FOR AUTOMOBILES

Philip Sacks, Elizabeth, and Marion M. McCoy, Whippany, N. J.

Application September 2, 1938, Serial No. 228,098

6 Claims. (Cl. 188—152)

This invention relates to controlling means for hydraulic brakes of automobiles, and it has as its primary object to provide new and improved mechanism, wholly under the control of the operator, for automatically maintaining the brakes set whenever it is desired to prevent the automobile from moving under the force of gravity.

Devices of this nature are particularly useful in preventing automobiles, which have been brought to rest on a hill, from starting to coast either forward or backward during the interval of time between the removal of the operator's foot from the brake-pedal and the initiation of the power drive of the automobile under the influence of the foot-controlled accelerator. While backward coasting of the automobile is usually more serious than forward coasting thereof, there are certain times and traffic conditions which render it desirable that no forward coasting take place.

Many devices of this general nature heretofore have been provided, but, insofar as we are aware, none has been entirely satisfactory. Of the devices heretofore provided for this purpose, some have been controlled by a hand-actuated control element located on the dash-board of the automobile. The inconvenience of reaching forward to the dash for the control element while holding both clutch and brake pedal depressed and simultaneously therewith attempting to shift gears and move the right foot from the brake pedal to the accelerator, will readily be perceived.

Other prior devices have been controlled by the clutch-pedal, the brakes being maintained set so long as the clutch-pedal is held depressed. This type of device is reasonably efficient in preventing coasting but it is objectionable in that it requires the operator to hold the clutch-pedal depressed so long as he desires to prevent the car from coasting. Under certain traffic conditions, and especially on long hills, this is decidedly tiring on the operator, inasmuch as the clutch-pedal is usually pressed outwardly by relatively strong spring pressure.

The clutch-pedal controlled device also is objectionable in that it embodies a control valve mechanism which is actuated each time the clutch-pedal is depressed, which obviously will be done many times in normal driving when it is not desired to lock the brakes. This constant actuation of the control valve is likely to result in wear and leakage in the valve and the device will then become impositive in its action and therefore ineffective.

Still other brake locking devices have been actuated from the accelerator. While this type of device eliminates some of the disadvantages of the clutch-pedal controlled mechanisms, it is objectionable in that it also includes a control element which is actuated at each depression of the accelerator and which therefore is subject to excessive and destructive wear.

Still others have been controlled by gravity-actuated valves which are effective when the automobile is on an up-grade but which are wholly ineffective on a down-grade.

This invention has as an object to provide a brake controlling mechanism, the use of which is optional with the operator, which will effectively maintain the brakes set as long as desired, and which is devoid of all the undesirable and objectionable features of prior constructions.

Another object of the invention is to provide a brake controlling mechanism which is entirely under the control of the operator, and which therefore will be actuated only when needed, and which may be actuated by him without any inconvenience whatsoever.

Still another object is to provide a brake controlling mechanism wholly under the control of the operator, to be actuated only when needed, and which will not require the operator to assume any awkward or unnatural position, his hands and feet being maintained in the same positions in which they would be located if the device were not present.

These objects have been attained by the provision of a hydraulic brake controlling mechanism including a check-valve which prevents the return of the fluid from the individual brake-actuating cylinders, and a control for said check-valve comprising an element located on the gear-shift lever where the operator normally has his hand when preparing to start his automobile. As shown, the means for shifting the check-valve comprises a vacuum system and an atmospherically actuated means for shifting the check-valve, together with a manually controlled oscillatory valve embodied in the hand-grasp on the upper end of the gear-shift lever. Suitable connections are provided for controlling the action of the pressure and vacuum systems to cause the check-valve to be closed when it is desired to maintain the brakes set, and to open the valve when it is desired to release the brakes. The construction illustrated also includes conduits connecting the intake manifold of the motor with the check-valve, the conduits being connected with the control valve on the gear-shift lever and including flexible portions whereby the normal universal movement of the gear-shift lever is not in any way restricted.

Other objects and advantages will be in part indicated in the following description and in part rendered apparent therefrom in connection with the drawings, depicting a preferred typical construction, which have been annexed as a part of this disclosure and in which:

Fig. 4 is a transverse sectional view, substantially on the line 4—4 of Fig. 3 showing a valve mechanism forming a part of our improved brake-locking mechanism, and actuating means therefor.

Fig. 5 is a right end view of Fig. 4, showing a pressure-actuated and vacuum-controlled device for actuating the brake-locking valve mechanism.

Fig. 6 is a plan view of a hand-actuable control valve secured upon the upper end of a conventional gear-shift lever for controlling our improved brake-locking mechanism.

Fig. 7 is a vertical sectional view through the control valve, substantially on the line 7—7 of Fig. 6.

Fig. 8 is a horizontal sectional view taken on the line 8—8 of Fig. 7.

Figure 2:
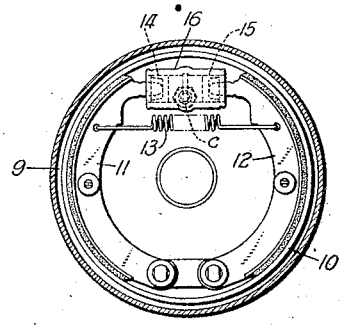
Fig. 2 is a detail face view of one of the hydraulically actuated brake mechanisms in connection with which the present invention may be employed.

Referring more specifically to the drawings, the invention is disclosed as embodied in an automobile comprising a chassis 1, wheels 2, a motor 3 having an intake manifold 4, a transmission casing 5, enclosing the usual speed-controlling shiftable gears (not shown), a gear-shift lever 6, for shifting the gears in the transmission casing, clutch-actuating pedal 7, brake-actuating pedal 8, and a hydraulically actuated brake, designated generally as 9 for each of the wheels 2. The brakes 9 may be of any desired or approved construction, such for example, as shown in Fig. 2, which includes a brake-drum 10, brake-shoes 11 and 12 normally held contracted by a spring 13 but adapted to be forced outwardly against the inner periphery of the brake-drum by hydraulically actuated pistons 14 and 15 slidingly mounted in fluid pressure cylinders 16. Fluid pressure is transmitted from a source of pressure to the cylinders 16, between the pistons 14 and 15, by a system of conduits designated generally as c and including specifically an initial pipe c', later to be referred to.

Fluid, preferably including oil, to actuate the brakes is stored in a reservoir R, forming a part of a hydraulic pressure system which also includes a pressure cylinder C connected by ports to the reservoir and having therein a piston P. The piston P is adapted to be pressed forward, to eject fluid from the cylinder C, through the conduits c' and c to the individual brake-actuating cylinders 16, by a rod 17 connected to and actuated by the brake pedal 8. A coil spring 18 in the cylinder C returns the piston to the position shown in Fig. 3.

All of the mechanism hereinbefore described is of conventional form; it forms no part of the present invention and further illustration and description thereof is therefore deemed unnecessary.

As hereinbefore stated, this invention provides improved manually controlled means for preventing return flow of the brake-actuating fluid from the individual brake-actuating cylinders whenever it is desired to maintain the brakes in their set or wheel-braking position. This has been effected by embodying in the conduit system intermediate the pressure cylinder C, and the individual brake actuating cylinders 16 a manually controlled check-valve which, when in one position permits forward and reverse flow of fluid through the system for actuating and releasing the brakes by the usual action of the brake pedal. In another position of the check-valve the actuating fluid may flow forwardly through the system to set the brakes but its return flow, to release the brakes is obstructed.

Figure 1:
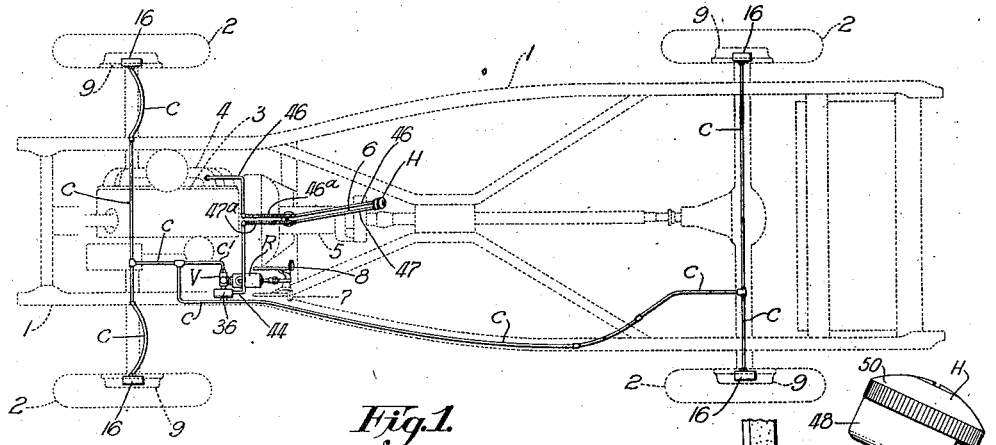
Fig. 1 is a diagrammatic plan view illustrating a portion of an automobile embodying the present invention.
Figure 3:
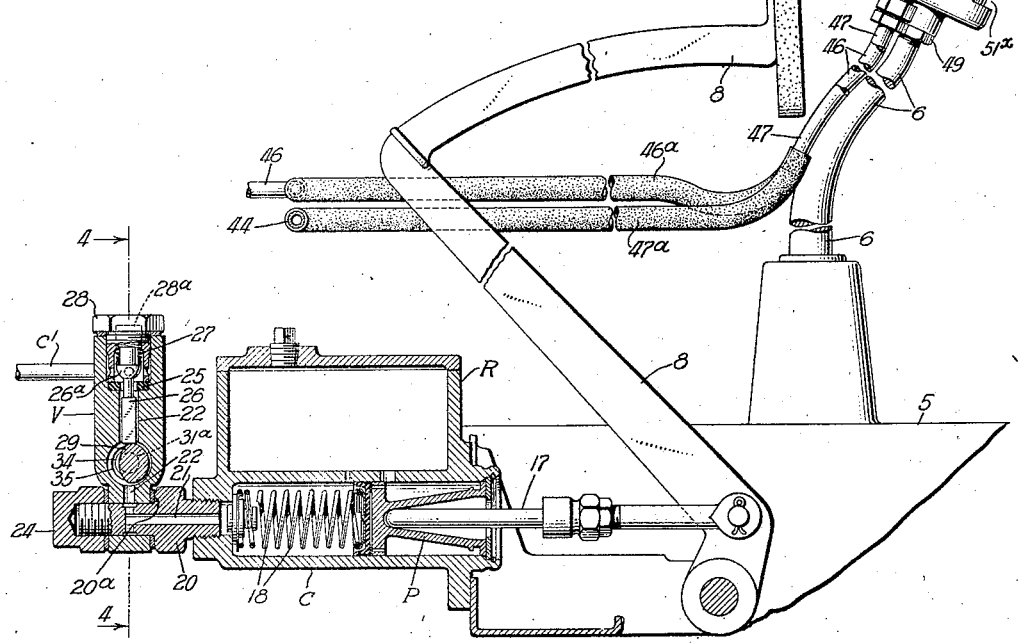
Fig. 3 is a longitudinal section view through a pedal-actuated hydraulic pressure producing means such as is commonly used to actuate hydraulic brakes, together with portions of our improved brake control mechanism associated therewith.

As shown in the drawings this check-valve comprises a casing V, connected to the discharge end of the pressure cylinder C by a threaded nipple 20 provided with an axial bore 21 (see Fig. 3). The bore 21 connects with a vertical bore 22 (see Fig. 4) formed in the valve casing V, which also provides a horizontal bore 23 with which is connected the initial pipe c' of the conduit system c. The valve casing is clamped upon the nipple 20 between a shoulder 20ª thereon and a clamp nut 24 threaded upon the outer end of the nipple (see Fig. 3) suitable washers being interposed between the surfaces to effect oil-tight joints. Fixed within the valve casing V, adjacent the upper end of the bore 22, is a valve-seat 25, preferably of hard rubber which, at certain times, is engaged by the conical portion 26ª of a valve-stem 26. This valve stem is normally pressed downwardly by a coil spring 27, interposed between the upper surface of the portion 26ª and the inner surface of a bore 28ª formed in a plug 28 threaded into the upper end of the valve casing. The lower end of the plug 28 bears upon the valve seat 25 to maintain it in fixed position in the valve casing, while the sidewalls of the plug are provided with radial ports 28ᵇ to permit the brake-actuating fluid to flow from the bore 22 to the bore 23.

When the check valve 26, 26ª is in the open position shown in Fig. 3 fluid in the cylinder C may, upon downward movement of the brake-pedal 8, be ejected therefrom through the bores 21, 22, port 28ᵇ, bore 23 and conduits c' and c to the individual brake actuating cylinders to apply the brakes, and, upon upward movement of the brake-pedal, flow backwardly through the same channels to the cylinder C, thereby releasing the brakes. When the check-valve is in the position shown in Fig. 4 the portion 26ª bears upon the seat 25 thereby preventing return flow of the fluid and consequently preventing the brakes from being released.

This invention provides novel and ingenious means, wholly under the control of the operator independently of the normal operation of the automobile, for determining the position of the valve 26, 26ª, thereby determining whether or not the fluid shall be permitted to return from the brake actuating cylinders to release the brakes. As shown most clearly in Figs. 3 and 4 this means includes an oscillatory cam 29 upon the periphery of which bears the lower end of the valve stem 26, under the influence of the spring 27. This cam is located in a chamber 30 in the valve casing V, and is secured upon a shaft 31 also journaled in the valve casing transversely of the axis of the nipple 20. To prevent leakage of oil about the shaft 31, the shaft has formed thereon an annular collar 32 which is pressed against a sealing washer 33 by a compression spring 34 surrounding the reduced forward end 31ª of the shaft 31 intermediate the cam 29 and the inner wall of a plug 35 threaded into the outer end of the chamber 30.

One end of the shaft 31 projects from the valve casing V and through a casing 36 secured upon a hub of the valve casing by a set screw 37. The casing 36 is of segmental form as shown in Fig. 5, and provides a chamber 38 within which is located a flapper or piston 39 which has its hub 38ª secured to the shaft 31 by set screw 40. A torsion spring 41, surrounding the hub 39ª and having one end secured to the casing 36 by a screw 42 and the other end secured to the shaft 31 by a screw 43, normally tends to shift the piston 39 counter-clockwise as viewed in Fig. 5, to the position indicated by the dot-dash lines and designated as 39ˣ.

In that position of the piston 39 the cam 29 is in the position shown in Fig. 3. The valve 26, 26ª therefore is raised and permits normal forward and reverse flow of fluid through the brake-actuating system.

When it is desirerd to close the check-valve to trap the fluid in the conduit system and the brake-actuating cylinders 16 to lock the brakes and prevent coasting of the automobile, the shaft 31 and the cam 29 carried thereby are rotated to the position shown in Fig. 4. This permits the valve-stem 26 to be depressed by the spring 27 thus forcing the conical portion 26ª of the valve into contact with the valve-seat 25, thereby preventing return flow of fluid from the brakes.

This invention provides novel means wholly under the control of the operator, for operation at will, for effecting oscillation of the cam 29 to open and close the check-valve 25, 26ª. As shown in the drawings, this means may include a vacuum system comprising the intake manifold 4 of the motor 3 and suitable conduits terminating in a pipe 44 connected with the casing 36 at one side of the piston 39, as shown in Fig. 5. Means, later to be described, are provided for optionally causing the vacuum of the intake manifold to be connected with pipe 44 thereby effecting a reduced pressure or suction in the chamber 38, in the casing 36, at that side of the piston 39. At the opposite side of the piston 39 the chamber 38 is connected to the atmosphere by a port 45 extending through a sidewall of the casing 36. Therefore, when suction is applied to the chamber 38 at that side of the piston to which the pipe 44 is connected, atmospheric pressure flowing through the port 45 will move the piston to the position shown in section in Fig. 5, thereby turning the shaft 31 and cam 29 to the position shown in Fig. 4, thus closing the check-valve 25, 26ª.

The means shown for connecting the vacuum system with the chamber 38 comprises a hand-conrtrolled valve H secured upon the upper end of the gear-shift lever 6. The valve H is connected to the intake manifold 4 by a conduit 46 including a flexible portion 46ª. The hand valve H is also connected with a conduit 44, which, in turn is connected with the casing 36, by a conduit 47 extending lengthwise of the gear-shift lever 6, and a flexible conduit 47ª connecting the conduits 44 and 47. The flexible conduits 46ª and 47ª permit the gear-shift lever 6 to be given its usual universal movements common to the shifting of the speed-change gears.

As shown most clearly in Figs. 6, 7 and 8, the hand valve H comprises a bottom section 48 threaded upon the upper end of the gear-shift lever 6, and locked thereon by a locknut 49, and a top section 50 rotatably mounted on the section 48 and held thereon by a screw 51 threaded into the section 48 and a coil spring 52 interposed between the head of the screw and a washer 53. The bottom section 48 is formed with ports 54 and 55, with which the conduits 46 and 47, respectively are connected, and a port 56 which extends through the bottom wall thereof to the atmosphere. The rotatable top section 50 is formed with a groove or channel 57 adapted, in one position of the section 50, (see Fig. 8) to connect together the ports 54 and 55 thereby to couple the vacuum system with the conduit 44 to close the check-valve 25, 26ª, and in another position to connect the port 55 with the port 56 to break the vacuum in the chamber 38 and permit the piston 39 to be returned to its dot-dash position in Fig. 5 by the spring 41, thereby opening the check valve 25, 26ª and releasing the brakes. When the section 50 is in the last named position the lower horizontal surface 50ª thereof closes off the port 54. A stop-pin 57′ carried by the rotatable section 50 of the hand valve H moves in a slot 51ˣ in the sidewall of the stationary section 48 and engages stop-shoulders 58 and 59 to definitely locate the section 50 in its two operative positions. A spring detent 60 carried by the rotatable section 50 is adapted to engage cavities 61 and 62, also formed in the sidewall of the section 48, to hold the section 50 in either of its two operative positions and prevent inadvertent rotation of the section 50.

Although this invention has been shown and described as embodying pressure actuated and vacuum controlled means for operating the check-valve which effects the locking of the brakes, it is to be understood that the invention is not limited to the employment of such means.

The most important feature of the invention is the placing of the control element in the position where the operator normally has his hand when preparing to start or stop the automobile and the operation of which is optional and therefore will be actuated only when required.

*Operation*

Assuming that an automobile embodying the present invention is to be brought to rest on a hill and the brakes are to be locked to prevent coasting, the operation of the device will be as follows:

The operator will depress the clutch pedal 7 to disconnect the power drive from the rear wheels and then depress the brake-pedal 8 to actuate the brakes to bring the automobile to rest, after which he will shift the gear-shift lever to place the transmission gears in "neutral" all as is customary in the normal operation of an automobile. Now, with his hand still on the hand-grasp of the gear-shift lever and with the brake-pedal depressed he will turn the valve section 50 a quarter turn to the right thereby connecting the vacuum of the intake manifold with the casting 36 through the conduit 46, 46ª, 47, 44 thereby creating a suction in that side of chamber 38, whereupon atmosphere pressure in the opposite side of the chamber will shift the piston 39 in opposition to the spring 41, to the position shown in section in Fig. 5. This will effect closing of the check-valve 25, 26ᵃ and locking of fluid in the individual brake-cylinders 16 and prevent release of the brakes. The operator may then remove his feet from both the brake and clutch pedals and the brakes will remain set so long as the motor continues to run and maintain a partial vacuum in the right side of chamber 38 as viewed in Fig. 4.

When the operator desires to again drive the car he will depress the clutch-pedal, shift the gear-shift lever to place the drive-gears in mesh, place his foot on the accelerator and speed up the motor slightly, while maintaining his hand on the hand-grasp of the gear-shift lever for subsequent further shifting of gears, all as is customary in normal driving. Then, as he releases the clutch-pedal he will give the valve-section 50 a quarter turn to the left, thus closing the port 54 and conduit 46, 46ᵃ and connecting the port 55 and conduit 47, 47ᵃ, 44 to atmosphere. The atmospheric pressure being equalized on opposite sides of the piston 39, that element will be shifted counter-clockwise, as viewed in Fig. 5, by the spring 41, to the position shown in dot-dash lines. This will cause the check-valve 25, 26ᵃ to be opened, thereby permitting return flow of fluid in the brake system, thus releasing the brakes whereupon complete release of the clutch-pedal will cause the automobile to be moved.

From the foregoing it will be perceived that this invention has provided a new and improved brake-locking mechanism which is wholly under the control of the operator; which is actuated only when it is desired to lock the brakes; which will entirely relieve the operator of all strain and effort in holding the automobile against coasting; and which readily may be controlled by the operator while maintaining the position which he normally assumes in driving his automobile. The only motion required to be made by the operator to lock or release the brakes is a quarter turn to the right or left of the hand-grasp on the gear shift lever which he normally has in hand when stopping and starting.

Having thus described our invention what we claim and desire to secure by Letters Patent of the United States is:

1. In combination with an automobile having wheels, a motor having an intake manifold, and a gear-shifting mechanism including a lever, of a fluid actuated wheel-braking mechanism including a pressure producing means and a conduit system connected therewith, means for locking said wheel-braking means in effective position including a check-valve connected with said conduit system for preventing return flow of fluid in said system, a spring tending to hold said check-valve closed, thereby to render the locking means effective, a cam normally holding said check-valve open in opposition to said spring, a chamber, a member movable in said chamber and operatively connected with said cam, whereby movement of said member actuates said cam to effect opening and closing of said check-valve, said chamber being connected to the atmosphere at one side of said member, a conduit connecting the other side of said chamber with said intake manifold, and a control valve connected with the last named conduit and located on said gear-shifting lever, for connecting the vacuum of said intake manifold with said chamber at one side of said member thereby to permit the atmospheric pressure at the opposite side thereof to shift said member to close said check-valve in opposition to said spring.

2. In combination with an automobile having wheels, a gear-shifting mechanism including a lever, and a vacuum system; of a fluid actuated wheel-braking mechanism including a pressure producing means and a conduit system connected therewith, means for locking said wheel-braking means in effective position including a check-valve connected with said conduit system for preventing return flow of fluid in said system, means for controlling said check-valve including a pressure actuated and vacuum controlled element connected with said check-valve, a conduit connecting said element with said vacuum system, and a control valve connected with the last named conduit and located on said gear-shifting lever, for controlling said check-valve.

3. A combination as set forth in claim 2, in which the conduit which connects the vacuum system with the vacuum-controlled element includes a flexible portion connected with the gear-shifting lever thereby permitting universal movement of said lever.

4. A combination as set forth in claim 2, in which the conduit which connects the vacuum system with the vacuum controlled element includes a flexible portion connected with the gear shifting lever thereby permitting universal movement of said lever, and in which the control valve comprises a first section rigidly secured upon a gear-shift lever and connected to two portions of said conduit, and a second section rotatable upon the first section and adapted in one position to connect together the two portions of said conduit to effect locking of said wheel-braking means and in another position to close one of said portions and to connect the other with the atmosphere to effect release of the brake-locking means.

5. A locking device for a hydraulic brake system of an automobile having a gear-shifting lever, comprising a valve embodied in said system for preventing return flow of fluid therein, mechanical power means for opening and closing said valve including a cam actuated by atmospheric pressure and controlled by a vacuum system provided by the automobile, and manual means for controlling said power means, said manual means including a manually operable element mounted on the gear-shifting lever.

6. A locking device for a hydraulic brake system of an automobile having a gear-shifting lever, comprising a valve embodied in said system for preventing return flow of fluid therein, mechanical power means for opening and closing said valve, and manual means for controlling said power means, said manual means including an oscillatory valve embodied in the hand-grasp on the upper end of the gear-shifting lever.

PHILIP SACKS.
MARION M. McCOY.